US012682754B2

(12) United States Patent
Ucar et al.

(10) Patent No.: US 12,682,754 B2
(45) Date of Patent: Jul. 14, 2026

(54) ASSISTED TRAFFIC MANAGEMENT

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 585 days.

(21) Appl. No.: 17/534,259

(22) Filed: Nov. 23, 2021

(65) Prior Publication Data

US 2023/0162601 A1 May 25, 2023

(51) Int. Cl.
*G07C 5/02* (2006.01)
*G07C 5/00* (2006.01)
*G08G 1/0967* (2006.01)

(52) U.S. Cl.
CPC ....... *G08G 1/096708* (2013.01); *G07C 5/008* (2013.01); *G07C 5/02* (2013.01); *G08G 1/096741* (2013.01)

(58) Field of Classification Search
CPC ....... G08G 1/096708; G08G 1/096741; G07C 5/008; G07C 5/02
USPC .......................................................... 701/117
See application file for complete search history.

(56) References Cited

U.S. PATENT DOCUMENTS 10,122,790 B2 11/2018 Cardote
10,794,720 B2 10/2020 Slavin
2015/0019270 A1* 1/2015 Jarvis ............... G06Q 10/06398 705/4
2018/0095456 A1* 4/2018 Obaidi ............... G07C 9/00174
2020/0327812 A1* 10/2020 Ran ........................ G08G 1/202
2021/0056843 A1* 2/2021 Kaur .................... G08G 1/0133
2021/0291732 A1* 9/2021 Woo ........................ H04W 4/46
2022/0343637 A1* 10/2022 Zhou .................... G06V 20/588

FOREIGN PATENT DOCUMENTS

WO 2021092039 A 5/2021
WO WO-2023156410 A1 * 8/2023 ............. B60K 35/10

OTHER PUBLICATIONS

McLachlan, Smart automotive technology adherence to the law: (de)constructing road rules for autonomous system development, verification and safety, Feb. 22, 2022, International Journal of Law and Information Technology, vol. 29, Issue 4 (Year: 2022).*

(Continued)

*Primary Examiner* — Matthias S Weisfeld
(74) *Attorney, Agent, or Firm* — SHEPPARD, MULLIN, RICHTER & HAMPTON LLP; Daniel N. Yannuzzi

(57) ABSTRACT

Systems and methods are provided for implementing traffic management techniques in connected, but not necessarily autonomous vehicles. In accordance with one embodiment, a method comprises determining a first vehicle instruction based on vehicle-related data; transmitting the first vehicle instruction to a first vehicle; when the first vehicle performs an action, inferring whether the action is in response to the first vehicle instruction; and based on the inference, transmitting a second vehicle instruction with a compensation action to a second vehicle.

20 Claims, 10 Drawing Sheets

(56) References Cited

OTHER PUBLICATIONS

Sharon et al., "Traffic Optimization for a Mixture of Self-Interested and Compliant Agents," The Thirty-Second AAAI Conference on Artificial Intelligence (AAAI-18), 2018, found at https://www.aaai.org/ocs/index.php/AAAI/AAAI18/paper/download/16414/15810.

* cited by examiner

ASSISTED TRAFFIC MANAGEMENT

TECHNICAL FIELD

The present disclosure relates generally to machine learning (ML) and artificial intelligence (AI) techniques. In particular, some implementations may reduce the amount of data exchanged between a group of vehicles and a remote processing or computing entity, such as an edge computing device or cloud computing server, and use the reduced amount of data to generate knowledge of vehicle operations and assist with traffic management of the group of vehicles.

DESCRIPTION OF RELATED ART

Current estimates indicate that vehicles can generate huge amounts of data, e.g., up to 4 TB of data every 1.5 hours for an autonomous vehicle. Accordingly, the amount of storage needed to maintain that data, as well as the amount of communications resources needed to transfer that data to the cloud for processing is enormous, and prohibitive given current technologies.

BRIEF SUMMARY OF THE DISCLOSURE

In accordance with one embodiment, a method comprises determining a first vehicle instruction based on vehicle-related data; transmitting the first vehicle instruction to a first vehicle; when the first vehicle performs an action, inferring whether the action is in response to the first vehicle instruction; and based on the inference, transmitting a second vehicle instruction with a compensation action to a second vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
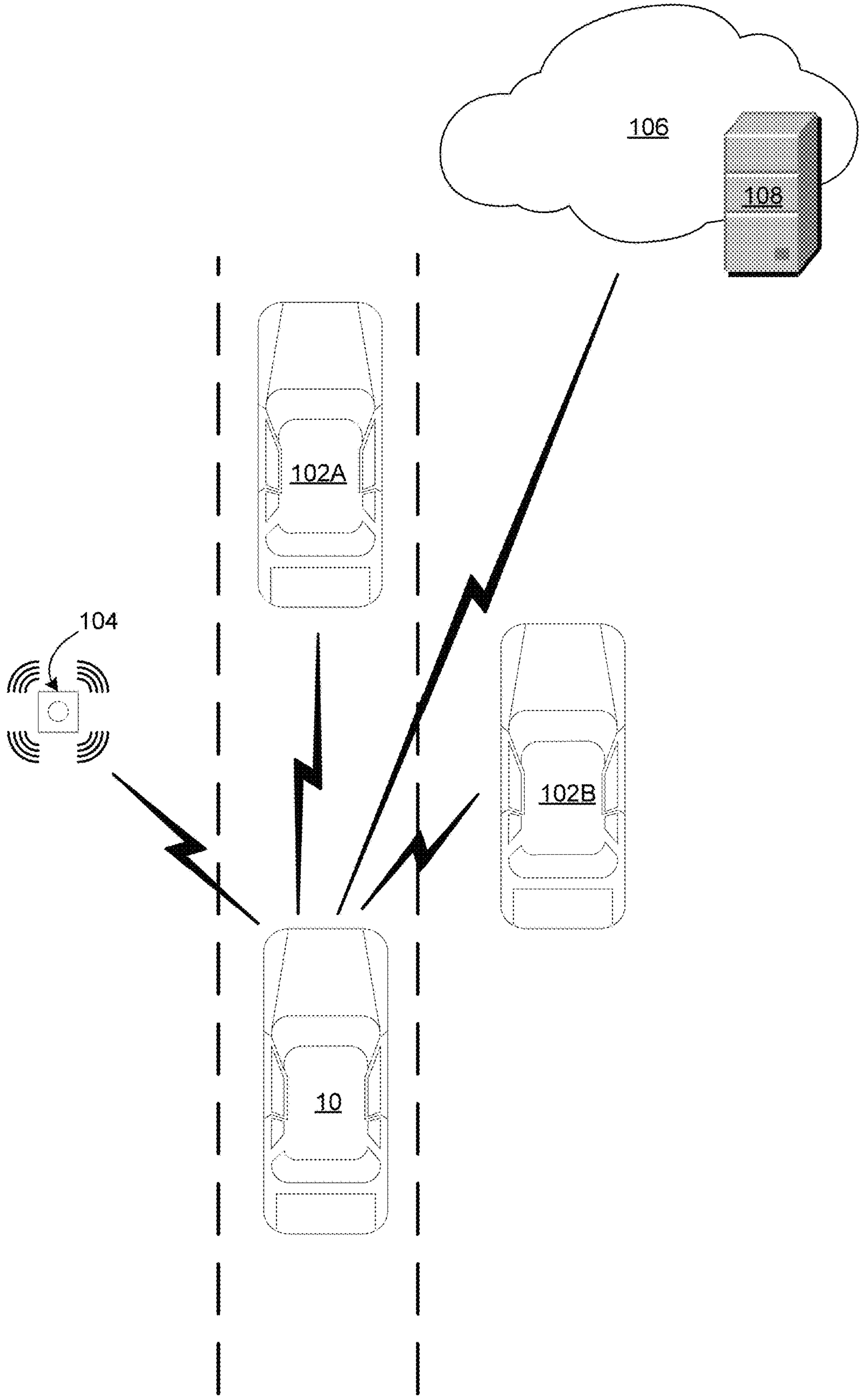
FIG. 1 is an example assisted traffic management system in which pre-filtering of vehicle-related data is performed prior to transmission to an AI system.

The figures are not exhaustive and do not limit the present disclosure to the precise form disclosed.

DETAILED DESCRIPTION

Embodiments of the systems and methods disclosed herein can use data generated by vehicles or other sensors associated with roadways to implement traffic management techniques in connected, but not necessarily autonomous vehicles.

For example, vehicles, such as autonomous vehicles or even conventional vehicles, may collect enormous amounts of data from various in-vehicle sensors, e.g., vehicle speed data, braking event data, passenger biometric data, etc. Vehicles may also receive large amounts of data from other vehicles (via vehicle-to-vehicle (V2V) communications), roadway infrastructure (via vehicle-to-infrastructure (V2I) communications), vehicle-to-cloud infrastructure (V2C) (e.g., vehicle communications via LTE or other protocol), and/or other data sources. Those other data sources may include third-party data providers, e.g., traffic-information service providers, as a result of mobile device-vehicle interactions, etc. (generally, connected car technologies). Using this data, the proposed traffic management system employs machine learning techniques to generate suggestions to ease traffic flow issues and compensate, if necessary, for the problem of driver non-compliance of those suggestions.

The proposed traffic management system tracks the suggested vehicle instructions (e.g., speed advisories, lane-change recommendations) transmitted to the vehicles to determine which suggested vehicle instructions are executed and which are not executed (e.g., using vehicle-related data or time series data received from sensors). This data may be provided as training data to a machine learning (ML) model to correlate the sensor data and driving behaviors, with the likelihood that a suggested vehicle instruction will be followed. The ML model can correlate the sensor data and driving behaviors with which suggested vehicle instructions are executed and vehicles for which the suggested vehicle instructions are not executed. The system may infer, using the trained ML model, the sensor data or driving behavior that may lead to the vehicles that execute and do not execute the suggested vehicle instruction.

Once the ML model is trained, the system can help detect whether future suggested vehicle instructions that are provided to particular vehicles will be followed. For example, the system may determine that a certain number of suggested vehicle instructions have or have not been executed and receive driving behavior of vehicles relative to the suggested vehicle instructions.

Using the ML model, the system may generate knowledge regarding the underlying reason(s) the autonomous system did not follow the suggested vehicle instruction. The autonomous vehicle may reject a given suggestion due to many reasons. For example, the instruction is marked as risky by the autonomous or Advanced Driver-Assistance System (ADAS) (e.g., the system may have one or more predefined thresholds and the suggested vehicle instruction may violate these thresholds). In another example, the autonomous vehicle may be required to take the approval from a human onsite driver or remote driver and the driver is not responding. In yet another example, the instruction may contradict with the autonomous or ADAS system's reward functions (e.g., the system may try to maximize the speed, but given suggestion reduces the speed).

For different types of vehicles (e.g., non-autonomous vehicles), the system may generate knowledge regarding the underlying reason(s) the non-executing drivers did not follow the suggested vehicle instruction. It should be understood that "non-executing drivers" can refer to drivers that did not execute a particular suggested vehicle instruction(s). That knowledge may be shared with other nearby network edge devices or cloud servers serving different regions of the roadway network. When such a network edge device or cloud server receives knowledge, it can generate additional suggested vehicle instructions accordingly.

Technical improvements are discussed throughout the disclosure. For example, the additional suggested vehicle instructions may vary based on several factors in order to help improve traffic flow overall. That is, the network edge devices or cloud servers attempts to compensate for the unexecuted vehicle instructions while achieving its assigned objective (e.g., abate traffic or move traffic away from an accident). Through such back-and-forth knowledge creation/sharing and utilization, the unexecuted vehicle instructions are mined and the reason behind them can be inferred. The other nearby network edge devices or cloud servers are informed about that reasoning, and they then try to produce additional suggested vehicle instructions to address or mitigate predicted non-executed vehicle instructions (e.g., by offering a compensation action) to achieve the overall goal across different types of vehicles and operators.

FIG. 1 illustrates an example assisted traffic management system in accordance with various embodiments. A vehicle 10 may have one or more sensors (not shown in FIG. 1), e.g., vehicle operating conditions sensors, environmental sensors. For example, vehicle 10 may have proximity sensors that can gather data regarding nearby objects or other vehicles, e.g., vehicles 102A and 102B. Vehicle 10 may further have vehicle-to-everything (V2X) communications capabilities, allowing vehicle 10 to communicate with roadside unit/equipment (RSU/RSE) or other roadside infrastructure, such as RSU 104 (which may be a V2I-enabled street light, for example). Vehicle 10 may also communicate with other vehicles, e.g., vehicles 102A and 102B, over V2V communications. It should be understood that sometimes, a vehicle itself may act as a network node or edge computing device. For example, vehicle 102B may be a network edge device. The data gathered by vehicle 10, either through its own sensors, or other data sources, e.g., RSU 104 and vehicles 102A and 102B, will ultimately be transmitted to a network edge device, such as vehicle 102B and/or to the cloud, e.g., a cloud server 108 resident on network 106. Cloud server 108 may be any computational server, such as a server utilizing artificial intelligence systems and/or methods to model and predict vehicle response to safety hazards, autonomous vehicle operation, predictive navigation, and so on.

For example, vehicle 10 may be receiving in-vehicle sensor information suggesting the operator of vehicle 10 is braking, e.g., a brake pedal actuation sensor. Likewise, vehicle speed sensed by a wheel rotation sensor also suggests a slow-down of vehicle 10. Additionally, both vehicle 102A and vehicle 102B transmit V2V communications data indicating that they too are slowing down, while RSU 104 transmits V2I communications data indicating that traffic within its sensed region appears to be experiencing a slow-down. In some embodiments, the aforementioned pre-filtering circuit (described in greater detail below) may determine that the data collected regarding the slow-down of vehicle 10 is cumulative or overlaps, and thus, only brake pedal actuation data is sent to cloud server 108. In some embodiments, the pre-filtering circuit may only transmit brake pedal actuation data corresponding to every second of a five-second period of time, despite the brake pedal actuation sensor collects data every 1/100 of a second. In some embodiments, cloud server 108 may specify this type of data collection based on a determined scenario pattern, which in turn can be based on previous experience that the requisite level of detail describing and/or associated with a similar event can be obtained with five data points upon which extrapolation can be based.

In other embodiments, the pre-filtering circuit may obtain the brake pedal actuation sensor data, and if it exceeds a brake pedal actuation threshold suggesting abnormally hard braking, will obtain additional sensor data, such as proximity sensor data, which in turn can trigger obtaining data from RSU 104 that may be used to verify that obtained from the proximity sensor. Accordingly, the brake pedal actuation sensor data, the proximity sensor data, and the RSU 104 data corresponding to a particular time period may be sent to cloud server 108 or to vehicle 102B (acting as a network edge device).

As referred to herein, AI can be described as an automated computer process(es) that can intelligently leverage data analysis for training itself for further optimizing the processes. ML can be generally considered an application of AI. AI techniques can include various approaches that are used in the area to achieve automated data analysis, such as neural, automated reasoning analysis (e.g., satisfiability modulo theories), and so on. AI-based techniques can be used to enhance computer-controlled features of vehicles in a manner that improves driving safety (e.g., a reduction of potential crashes), provides uniform traffic flow (e.g., slows a traveling speed), directs vehicles away from an accident or other road hazard (e.g., change lanes or enter a high occupancy vehicle (HOV) lane away from a road hazard), and optimizes driving performance of vehicles (e.g., fuel efficiency) for a practical application and/or operational environment, as noted above.

For purposes of illustration, embodiments are described here with respect to automobiles. However, it should be appreciated that the AI techniques disclosed herein are not limited to automobiles. The systems and methods disclosed herein may be implemented with any of a number of different vehicles and vehicle types. For example, the AI systems and methods disclosed herein may be used with automobiles, trucks, motorcycles, boats, recreational vehicles, and other on-road or off-road vehicles. In addition, the principals disclosed herein may also extend to other vehicle types as well.

According to an embodiment, vehicle 10 of FIG. 1 can be an autonomous vehicle. As used herein, "autonomous vehicle" can refer to a vehicle that is configured to operate in an autonomous operational mode. "Autonomous operational mode" can refer to the use of one or more computing systems of the vehicle 10 to navigate and/or maneuver vehicle 10 along a travel route with a level of input from a human driver which can vary with the operational mode. As such, vehicle 10 can have a plurality of autonomous operational modes. In some embodiments, vehicle 10 can have an unmonitored autonomous operational mode, meaning that one or more computing systems are used to maneuver vehicle 10 along a travel route fully autonomously, requiring no input or supervision required from a human driver.

Alternatively, or in addition to the above-described modes, vehicle 10 can have one or more semi-autonomous operational modes. "Semi-autonomous operational mode" can refer to mode whereby a portion of the navigation and/or maneuvering of vehicle 10 along a travel route is performed by one or more computing systems, and a portion of the navigation and/or maneuvering of vehicle 10 along a travel route is performed by a human driver. One example of a semi-autonomous operational mode is when an adaptive cruise control system is activated. In such case, the speed of vehicle 10 can be automatically adjusted to maintain a safe distance from a vehicle ahead based on data received from on-board sensors, but vehicle 10 is otherwise operated manually by a human driver. Upon receiving a driver input to alter the speed of the vehicle (e.g. by depressing the brake pedal to reduce the speed of the vehicle 10), the adaptive cruise control system is deactivated, and the speed of the vehicle is reduced.

In order to achieve the above-described modes of operation (or other manner of operating or utilizing vehicle 10), AI or ML systems and methods may be used to predict or implement operational commands or instructions, e.g., from an electronic control unit (ECU) of vehicle 10. Such AI or ML systems may rely on models trained using data from vehicle 10 (or other vehicles), for example. This data, as described above, can be pre-filtered. In some embodiments, vehicle 10 may include a resident AI/ML system (not shown) that relies on sensed data. This sensed data may also be pre-filtered reducing the amount of data that the resident AI/ML system needs to process or analyze. Even in vehicle 10, a reduction in the amount of data that needs to be stored, processed, transmitted between systems in vehicle 10 will be improved, again, through more efficient resource utilization, reduced storage needs, faster learning, etc.

Figure 2:
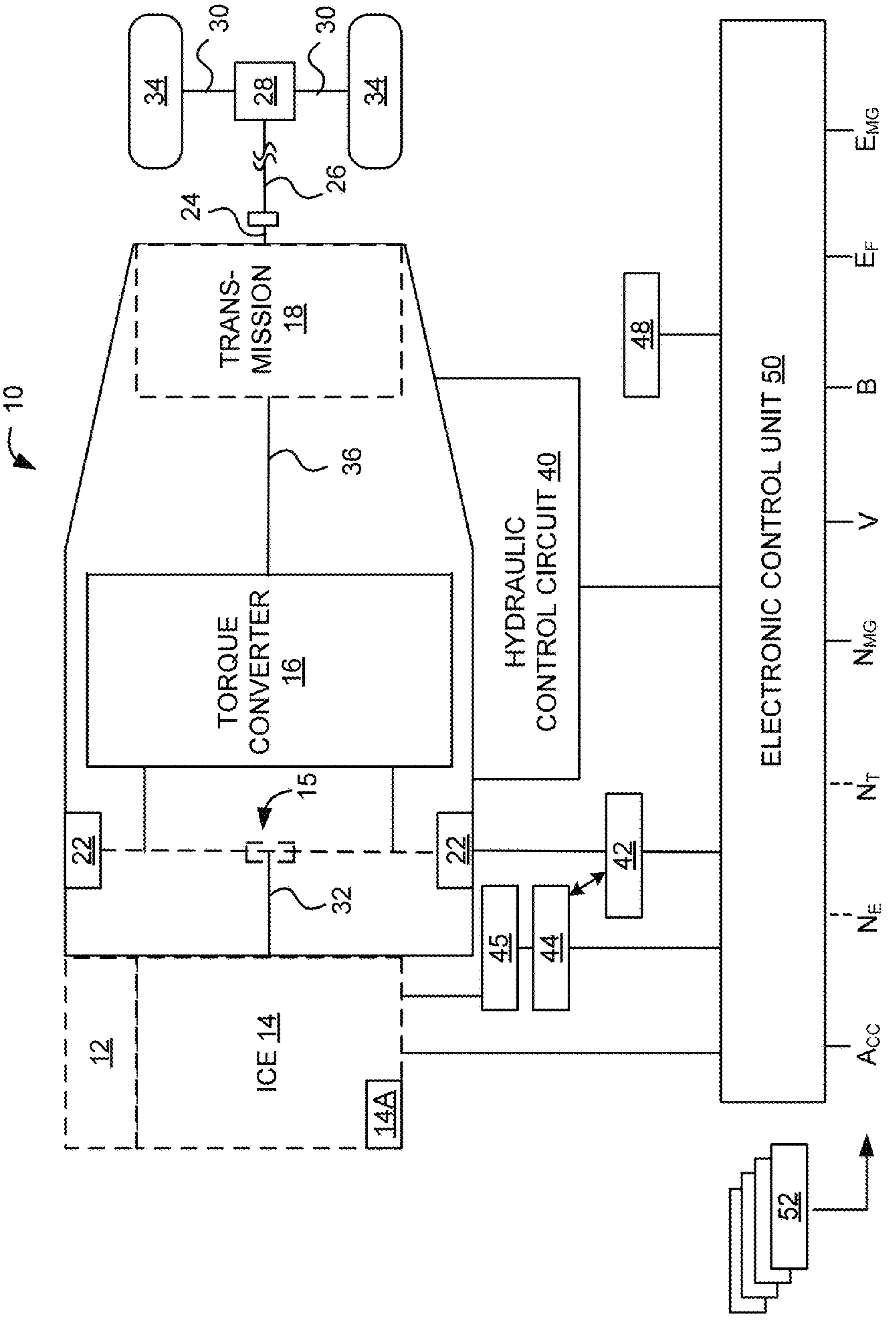
FIG. 2 is a schematic representation of an example vehicle with which embodiments of the pre-filtering systems and methods disclosed herein may be implemented.

An example vehicle in which embodiments of the disclosed technology may be implemented is illustrated in FIG. 2. Although the example described with reference to FIG. 2 is a hybrid type of vehicle, the systems and methods described herein can be implemented in other types of vehicles including gasoline- or diesel-powered vehicles, fuel-cell vehicles, electric vehicles, or other vehicles.

FIG. 2 illustrates a drive system of vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 10 may be driven/powered with either or both of engine 14 and motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 10 relies on the motive force generated at least by internal combustion engine 14, and clutch 15 may be included to engage engine 14. In the EV travel mode, vehicle 10 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from electronic control unit 50, described below. Such output control can include, for example, throttle control, fuel injection control, and ignition timing control.

Motor 22 can also be used to provide motive power in vehicle 10 and is powered electrically via battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move vehicle 10 and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through inverter 42.

Torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of vehicle 10. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems 48 in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, $N_E$, of internal combustion engine 14 (engine RPM), a rotational speed of the motor 22 (motor rotational speed), $N_{MG}$, and vehicle speed, V. These may also include torque converter 16 output, $N_T$ (e.g., output amps indicative of motor output), brake operation amount/pressure, B, battery (i.e., the charged amount for battery 44 detected by an system on chip (SOC) sensor). Accordingly, vehicle 10 can include a plurality of sensors 52 that can be used to detect various conditions internal or external to the vehicle and provide sensed conditions to electronic control unit 50 (which, again, may be implemented as one or more individual control circuits). In one embodiment, sensors 52 may be included to detect one or more conditions directly or indirectly such as, for example, fuel efficiency, $E_F$, motor efficiency, $E_{MG}$, hybrid (e.g., ICE 14 and MG 12) efficiency, acceleration, ACC, etc.

Additionally, one or more sensors 52 can be configured to detect, and/or sense position and orientation changes of the vehicle 10, such as, for example, based on inertial acceleration. In one or more arrangements, electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, electronic control unit 50 receives signals from a speedometer to determine a current speed of the vehicle 10.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade.

While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 10 and/or information/data about such objects. Such objects can be stationary objects and/or dynamic objects. Further, the sensors can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 10 and/or information/data about such objects. Such objects can be stationary objects and/or dynamic objects. Further, the sensors can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

Each of the detected data discussed herein may comprise vehicle-related data. For example, sensors 52 may acquire internal vehicle information, external driving environment data, or any other information described herein. In some examples, sensors 52 may generate the vehicle-related data and/or other vehicle systems illustrated in FIG. 3 may receive the data from sensors 52 to generate the vehicle-related data.

Figure 3:
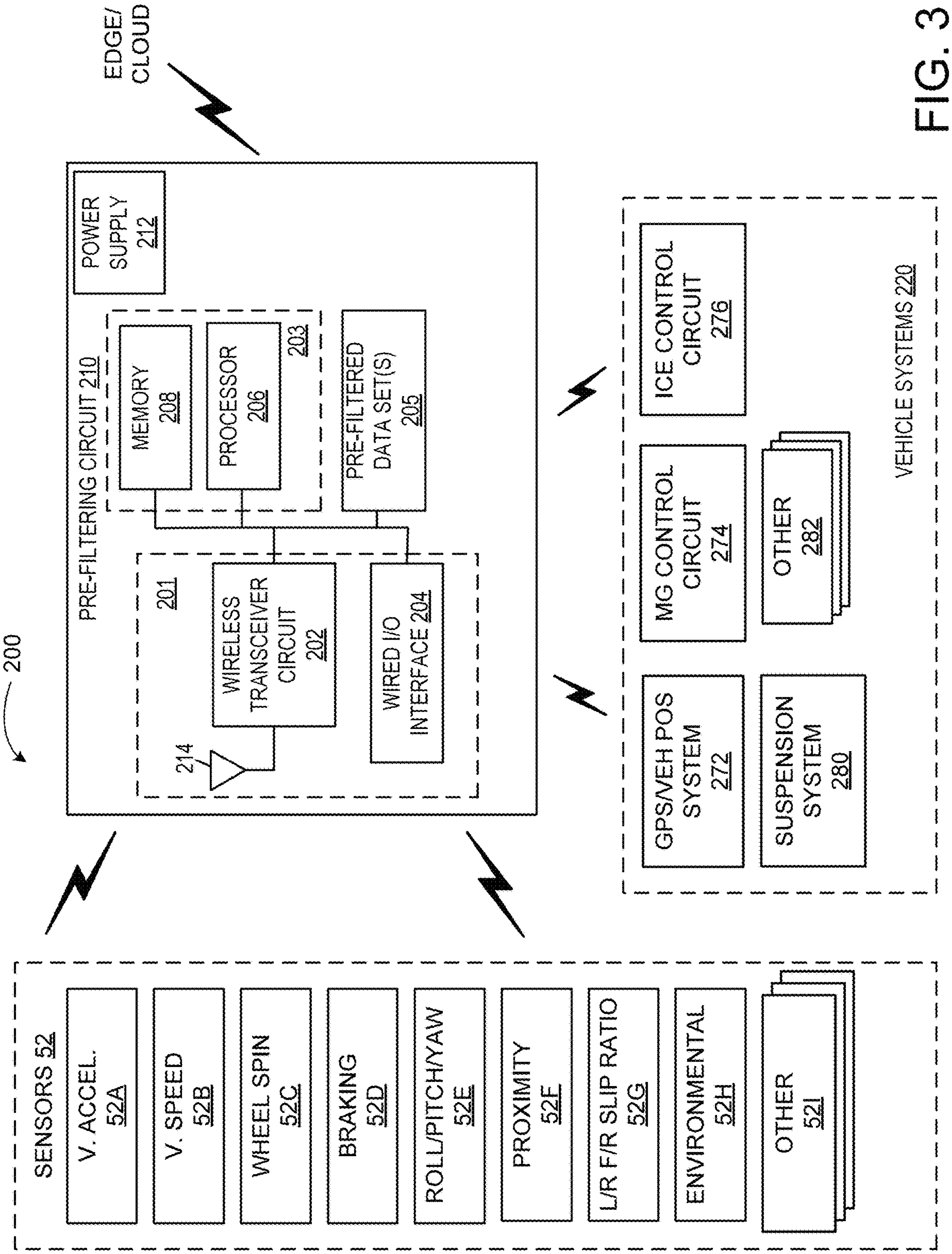
FIG. 3 illustrates an example architecture pre-filtering in accordance with one embodiment of the systems and methods described herein.

FIG. 3 illustrates an example architecture for assisted traffic management in accordance with one embodiment of the systems and methods described herein. In this example, pre-filtering system 200 includes a pre-filtering circuit 210, the plurality of sensors 52, and one or more vehicle systems 220. Sensors 52 and vehicle systems 220 can communicate with pre-filtering circuit 210 via a wired or wireless communication interface. Although sensors 52 and vehicle systems 220 are depicted as communicating with pre-filtering circuit 210, they can also communicate with each other as well and with other vehicle systems. Pre-filtering circuit 210 can be implemented as an ECU or as part of an ECU such as, for example ECU 50. In other embodiments, pre-filtering circuit 210 can be implemented independently of an ECU.

Pre-filtering circuit 210, in this example, includes a communication circuit 201, a decision circuit 203 (including a processor 206 and memory 208 in this example) and a power supply 212. Components of pre-filtering circuit 210 are illustrated as communicating with each other via a data bus, although other communication in interfaces can be included.

Processor 206 can include a GPU, CPU, microprocessor, or any other suitable processing system. Memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to control pre-filtering circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up pre-filtering circuit 210.

Communication circuit 201 may be either or both a wireless transceiver circuit 202 with an associated antenna 214 and a wired I/O interface 204 with an associated hardwired data port (not illustrated). As this example illustrates, communications with pre-filtering circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by pre-filtering circuit 210 to/from other entities such as sensors 52 and vehicle systems 220.

Wired I/O interface 204 can include a transmitter and a receiver (not shown) for hardwired communications with other devices. For example, wired I/O interface 204 can provide a hardwired interface to other components, including sensors 52 and vehicle systems 220. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 2. Sensors 52 can include additional sensors that may or not otherwise be included on a standard vehicle with which the pre-filtering system 200 is implemented. In the illustrated example, sensors 52 include vehicle acceleration sensors 52A, vehicle speed sensors 52B, wheelspin sensors 52C (e.g., one for each wheel), a tire pressure monitoring system (TPMS) 52G, accelerometers such as a 3-axis accelerometer 52E to detect roll, pitch, and yaw of the vehicle, proximity sensors 52F, and environmental sensors 52H (e.g., to detect precipitation or other environmental conditions). Additional sensors 52I can also be included as may be appropriate for a given implementation of pre-filtering system 200.

Vehicle systems 220 can include any of a number of different vehicle components or subsystems used to control or monitor various aspects of a vehicle, e.g., vehicle 10, and its performance. In this example, vehicle systems 220 include a GPS or other vehicle positioning system 272; motor control circuits 274 (e.g., to control operation of motor/generator 22); engine control circuits 276 (e.g., to control the operation of the engine including internal combustion engine 14); suspension system 280 (e.g., an adjustable-height air suspension system), and other vehicle systems 282.

In operation, pre-filtering circuit 210, by way of communication circuit 201, can receive data from various vehicle sensors 52 regarding vehicle operating conditions, environmental conditions, and/or other conditions relevant to operation of the vehicle, e.g., proximity information regarding road obstacles, neighboring vehicles, etc. Pre-filtering circuit 210 may also receive information relevant to operation of the vehicle via V2X communications, e.g., upcoming traffic information, road speed limit information, and the like. As alluded to above, one or more vehicle systems 220 may also provide information relevant to vehicle operation to pre-filtering circuit 210. As can be appreciated, the amount of data/information available to and generated by the vehicle itself is sizable, especially considering that sensors 52, for example, may be configured to collect information about their respective components/operations continuously, e.g., every 1/100 of a second.

In some embodiments, upon receipt of the aforementioned data and/or information, the data/information may be stored in memory 208, e.g., in a cache or buffer portion of memory 208. Decision circuit 203 may access memory 208 to analyze the received data/information to determine what data/information should be retained and/or transmitted to the edge/cloud for use, e.g., by a cloud server to train an AI model. Afterwards, that pre-filtered data may comprise a pre-filtered data set that is transmitted to the edge/cloud. In some embodiments, a network edge device or the aforementioned cloud server may have a scenario pattern or profile that requires a particular number of data points (e.g., a minimum or threshold number of five data points to generate the scenario profile). In some embodiments, such a scenario pattern or profile may be shared with the pre-filtering circuit 210 so that the requisite number of data points can be extracted by pre-filtering circuit 210 from the received data/information. In some embodiments, a network edge device or cloud server may simply transmit instructions to pre-filtering circuit 210 regarding the number of data points that are required in order for the cloud server or network edge device to extrapolate or interpolate one or more estimated values based on the data points. In still other embodiments, pre-filtering circuit 210 may be pre-programmed with scenario patterns so that pre-filtering circuit 210 can determine, depending on a particular scenario, collect or cull the received or generated data/information accordingly prior to transmission to a network edge device or cloud server.

For example, a cloud server training a predicted safety-response AI model may require five data points regarding vehicle speed while the vehicle is traversing a high velocity curve in the road. Although vehicle speed sensor 52B may collect vehicle speed information every 1/100 of a second resulting in 100 data points per second, the high velocity curve scenario pattern may only require five data points per second in order to allow the cloud server to train the predicted safety-response AI model. Thus, decision circuit 203 effectively performs a data reduction function. In this way, the cloud server, for example, can apply linear extrapolation to the data points received from pre-filtering circuit 210. In some embodiments, pre-filtering circuit 210 may append counter information to the data points to indicate to the cloud server or network edge device how many data points are being sent/have been sent.

In some embodiments, decision circuit 203 of pre-filtering circuit 210 may further reduce the amount of data/information that is sent by simply transmitting or uploading values, e.g., in comma-separated value (CSV) format. That is, for a particular event or series of events, e.g., within a particular time period, the requisite values may be put in a CSV file, e.g., one embodiment of pre-filtered data set 205, for transmission to the cloud server. The cloud server may run an extrapolation process(es) on the values contained in the CSV file, and for example, may run an identification algorithm to determine if the values indicate the same/similar scenario as what was predicted, to analyze the scenario or event(s), or to be used as feedback to make an AI model more accurate. In some embodiments, the results of the AI modeling, training, prediction, etc. can be fed back into one or more of the vehicle systems 220. For example, and following the above example, if the scenario or event(s) represented by the pre-filtered data is the same/similar as the predicted scenario or event(s), a determined response regarding vehicle positioning or re-positioning may be performed by GPS/vehicle positioning system 272. If the scenario or events involved traversal of a high velocity curve, the network edge device or cloud server may respond by instructing suspension system 280 to stiffen the suspension of vehicle 10.

In some embodiments, due to the reduced amount of data that is sent for processing, communication circuit 201 may leverage burst transmissions to the network edge device or cloud server or is able to send all the requisite data in a single transmission or message, for example. Because the network edge device or cloud server has to process, analyze or otherwise address less data, it can perform its analysis or data processing more quickly, resulting in a faster result or output. In turn, that result or output can be more quickly reflected in one or more vehicle systems 220, e.g., in real-time or near-real time.

In accordance with other embodiments, decision circuit 210 may receive first data, e.g., a first sensor data from one or more of sensors 52. Based on pre-programmed or determined scenario patterns, decision circuit 210 may obtain or request second sensor data to be obtained from an additional sensor(s) or additional data from other data sources, based on the first sensor data. That is, a particular scenario pattern may comprise a series of sensor data, and when first sensor data corresponds to one of the series of sensor data in the scenario pattern, decision circuit 203 may trigger data collection regarding other ones of the series of sensor data. In some embodiments, the triggering of "serial" data collection may be prompted by data, e.g., sensor data, whose value relative to a threshold, necessitates additional data collection.

For example, a braking event may be sensed by braking sensor 52D. If the braking sensor 52D senses a braking event, that braking sensor data is transmitted to pre-filtering circuit 210. Decision circuit 203 of pre-filtering circuit 210 may analyze the braking sensor data, and determine that it exceeds a hard braking threshold, at which point, decision circuit 203 triggers data collection from proximity sensor 52F in order to determine whether or not the hard braking event was the result of an upcoming obstacle or neighboring vehicle(s). If proximity sensor 52F transmits data indicating no upcoming obstacle or neighboring vehicle, decision circuit 203 may trigger data collection from the tire pressure sensor 52G to determine if the hard braking event could be attributed to a loss of tire pressure (flat), and so on. In this way, data collection can be predicated on the existence of a particular data element, thereby avoiding conventional data collection that generally occurs in a non-discriminatory fashion, which in turn reduces the amount of data that is ultimately collected and transmitted to a processing or analysis element, such as a network edge device, cloud server, or resident AI system.

In other embodiments, the receipt of first data at pre-filtering circuit 210 that meets, exceeds, or fails to meet a particular threshold, decision circuit 210 may access memory 208 to look for other data instances that have met, exceeded, or failed to meet a related threshold. For example, sensor data may be collected by pre-filtering circuit 210, and stored in a data cache or buffer portion of memory 208. Upon receiving data from wheel spin sensor 52C that exceeds a wheel spin threshold, decision circuit 203 may access memory 208 to search for other data, e.g., roll/pitch/yaw data from sensor 52E whose value(s) relative to a roll/pitch/yaw threshold may indicate the existence or occurrence of a particular event(s) or road/environmental condition.

In some embodiments, the transmission of data to a network edge device, a cloud server, or resident AI system in vehicle 10 can be performed in similarly "serial" fashion. That is, first data or a first set of data may be received by pre-filtering circuit 210, which is then transmitted to a following the above example, upon receipt of data from wheel spin sensor 52C that exceeds a wheel spin threshold, decision circuit 203 may determine that the sensor data from wheel spin sensor 52C is to be sent out. However, in this embodiment, decision circuit 203 will wait for a response from the receiving network edge device, cloud server, or other AI system requesting additional data be obtained. That is, the network edge device, cloud server, or other AI system may, in real-time or within some specified time period (provided data is maintained in memory 208), analyze or process the data from wheel spin sensor 52C and make a determination that additional data is needed. The network edge device, cloud server, or AI system can then respond to the receipt of the wheel sensor data and indicate to decision circuit 203 that it should obtain that additional data, i.e., roll/pitch/yaw data from sensor 52E. Decision circuit 203 can then obtain that data from memory 208.

For example, the network edge device, cloud server, or AI system may make the determination to obtain additional data based on a known or predicted scenario pattern. Alternatively, the network edge device, cloud server, or AI system may make the determination to obtain additional data based on extrapolation/interpolation of the received data not resulting in the desired accuracy, output granularity, etc. Thus, even if the scenario or received data is not yet associated with a known scenario or expected event(s), certain types of data can be focused on. For example, a determination may be made by the network edge device, cloud server, or AI system (or even the decision circuit 203) to obtain additional information from sensors or data sources that are known to be impacted or have an impact on an element from which or with which the first received data is associated. Again, the transmission and analysis of excessive amounts of data can be avoided as a result of this manner of data collection. It should be noted that in some embodiments, for example, this edge/cloud-driven data collection can be used to direct other vehicles' data collection mechanisms. For example, upon a cloud server obtaining five data points per second from a first vehicle regarding some event(s) or scenario, the cloud server may determine that only three data points per second are needed to perform the desired analysis/make a prediction with the requisite accuracy. Accordingly, the cloud server may instruct vehicles neighboring the first vehicle to only collect three data points per second, e.g., by updating a scenario pattern or through direct instruction (vis-à-vis V2X communications).

Figure 4:
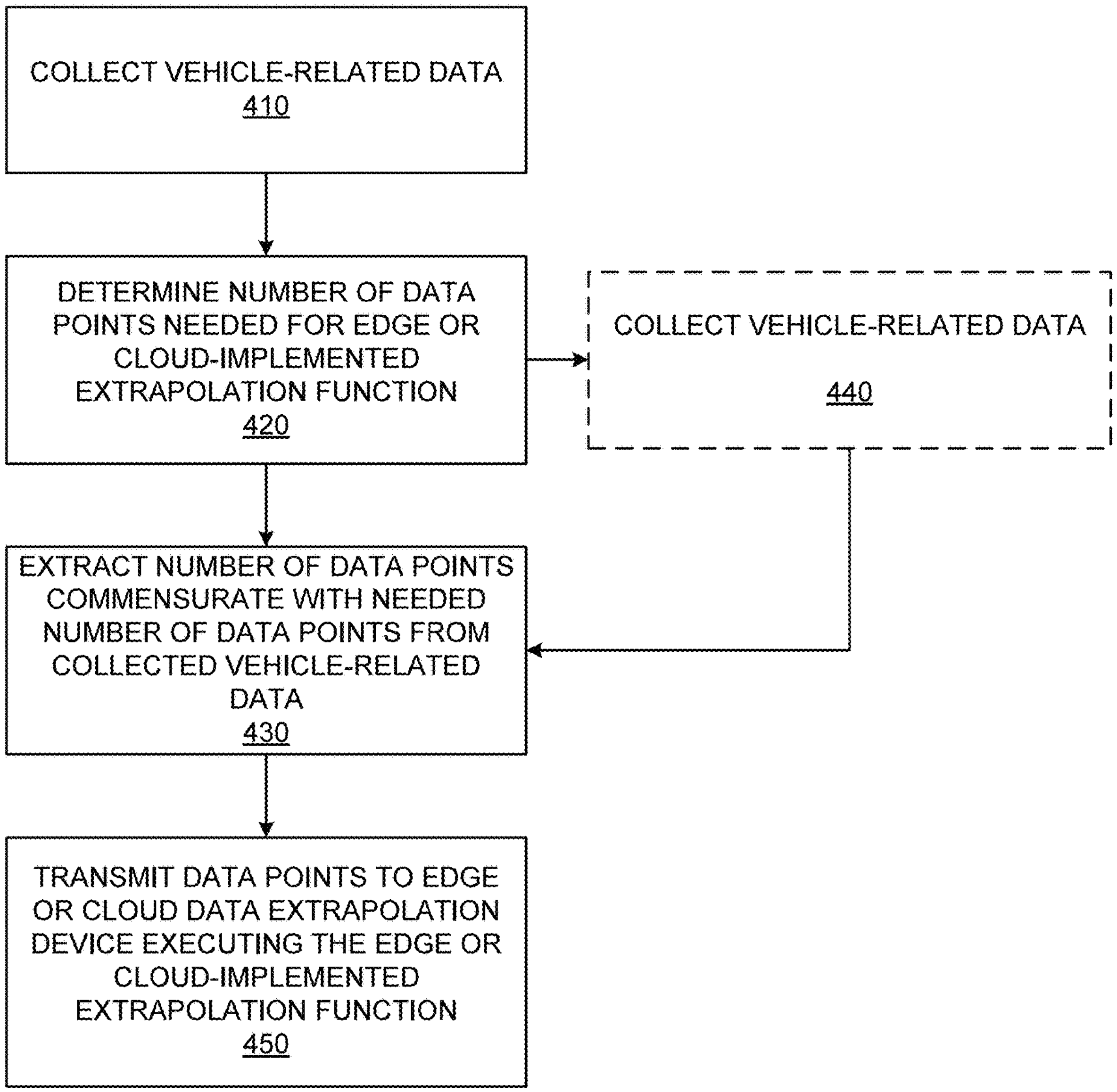
FIG. 4 is a flow chart illustrating example operations for implementation pre-filtering in accordance with one embodiment.

FIG. 4 is a flow chart illustrating example operations that can be performed to pre-filter data in accordance with one embodiment of the present disclosure. The operations illustrated in FIG. 4 and described herein can be performed by pre-filtering circuit 210, for example.

At operation 410, vehicle-related data is collected. As described above, a vehicle, e.g., vehicle 10, may have various on-board sensors 52, and can receive information from other data sources, such as other vehicles, RSUs, third-party information sources, such as traffic information providers. Data can be collected and stored by pre-filtering circuit 210, in particular, by decision circuit 203 and memory 208, respectively.

At operation 420, a number of data points necessary for performing at least one of an extrapolation and interpolation function is determined. For example, a scenario pattern may be used/referenced to determine the number of data points needed to make a prediction, confirm a scenario or event, or perform any relevant AI or ML analysis of data. In some embodiments, the pre-filtering circuit 210, in particular, the decision circuit 203, may be pre-programmed with information/instructions regarding the requisite number of data points that should be collected for transmission to the entity performing the extrapolation/interpolation function. In other embodiments, that entity may in real-time or within a particular time period, instruct the pre-filtering circuit 210 as to how many data points are needed. In still other embodiments, that entity may update a scenario pattern or adjust its instructions regarding the number of data points that are needed. In this way, even if vehicle sensors are constantly or continuously collecting data, if the vehicle is receiving copious amounts of information, only the requisite data needed for AI/ML use is actually sent.

In some examples, the entity is a network edge device or cloud server that collects the data points and other vehicle-related data remote from vehicle 10. The vehicle-related data may be used to determine a suggested vehicle instruction that can request the operator of the vehicle to alter the operation of the vehicle or perform some other action.

At operation 430, the number of data points commensurate with the necessary number of data points are extracted from the collected vehicle-related data. It should be understood that an AI model, for example, or the scenario pattern may dictate whether the necessary data points are equally (e.g., every X seconds) or non-equally distributed relative to time of collection. In some embodiments, pre-filtering circuit 210 may trigger the collection of vehicle-related data only after determining the number of data points needed for performing the extrapolation/interpolation function at operation 440. In this case, decision circuit 203 may explicitly query a certain data sensor(s) or request data from a particular data source(s) rather than access already-collected data matching a particular time stamp, time period, or other data collection parameter for obtaining the requisite number of data points.

At operation 450, the extracted data points are transmitted to the entity performing the at least one of the extrapolation and interpolation function. Again, the entity may be a network edge device, a cloud server, or some AI/ML system resident on the vehicle. In this way, the amount of data transmitted can be reduced. Moreover, as a result of transmitting less data, the communications resources needed for transmission are occupied less and/or the communication resources need not be as robust as might normally be required when large amounts of data need to be transferred.

Figure 5:
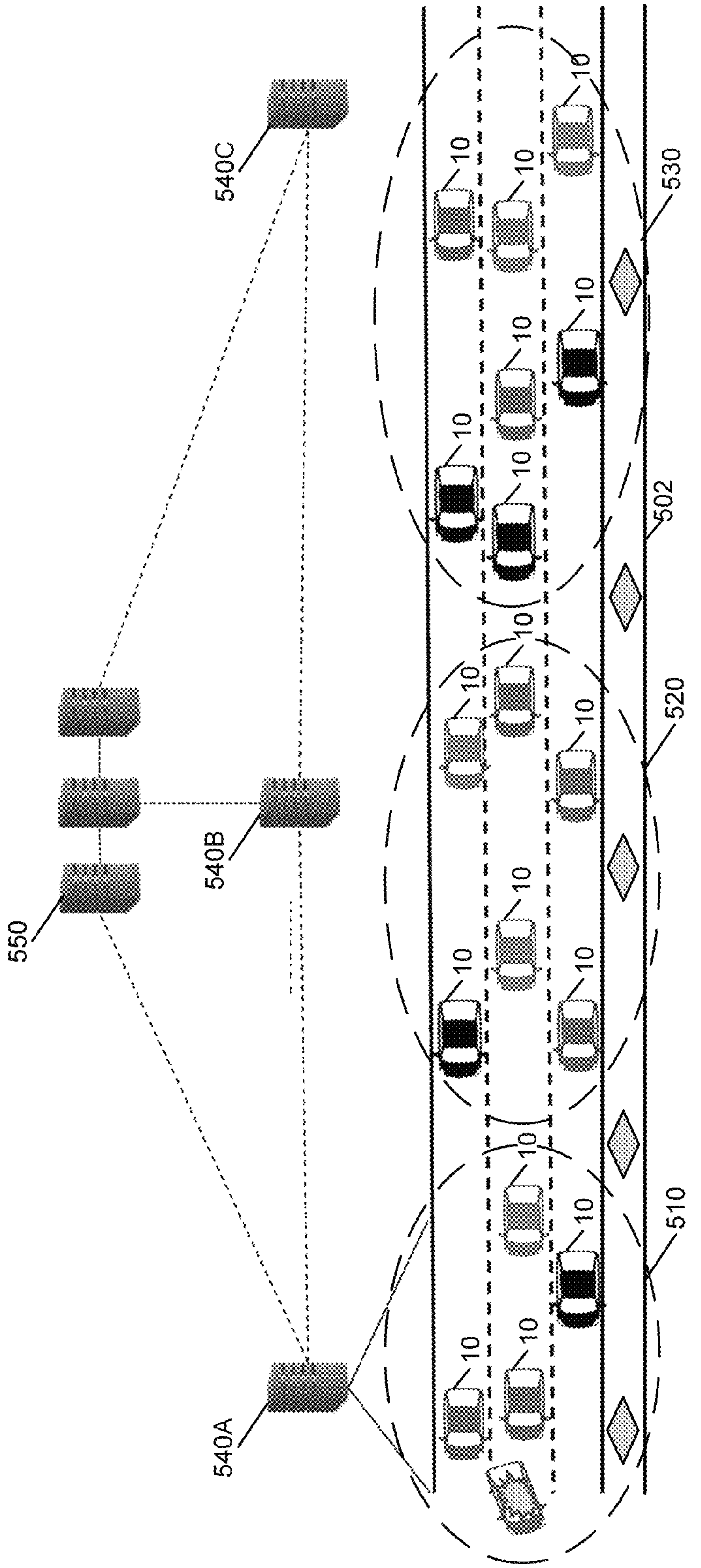
FIG. 5 is an example environment in which assisted traffic management using vehicle-related data is performed.

FIG. 5 is an example environment in which assisted traffic management using vehicle-related data is performed. In this illustration, a plurality of vehicles 10 are identified on a roadway 502. Some of the plurality of vehicles 10 may be in communication with a network edge device or cloud server 540 (illustrated as first network edge device or cloud server 540A, second network edge device or cloud server 540B, and network edge device or cloud server 540C) that can transmit suggested vehicle instructions to one or more of these vehicles 10.

A cluster of vehicles may be determined by a network edge device or cloud server 540 or data center 550. For example, a cluster of vehicles may be identified using various methods, including identifying clusters of vehicles based on location of each of the vehicles adjacent to a network edge device or cloud server 540 (e.g., within a threshold distance of an edge device corresponding with a timestamp) or identifying clusters of vehicles based on the type of vehicle that may receive instructions from the network edge device or cloud server 540 (e.g., vehicles that incorporate a V2V, V2C, or V2I or operate semi-autonomously).

In this illustration, three clusters are identified, including first cluster of vehicles 510, second cluster of vehicles 520, and third cluster of vehicles 530. The identification of the three clusters of vehicles may be based on the location of the vehicles adjacent to each network edge device or cloud server 540 (illustrated as first edge device 540A, second edge device 540B, and third edge device 540C). The network edge devices or cloud servers 540 may be implemented as one or more edge devices to correspond with multiple physical locations of clusters of vehicles or may be implemented virtually and assigned different locations corresponding with each cluster of vehicles (e.g., co-located in a same building or data center).

Network edge devices or cloud servers 540 may also communicate with data center 550. Data center 550 may collect the sensor data or other vehicle-related data associated with the vehicles in the plurality of clusters of vehicles.

As discussed herein, first network edge device or cloud server 540A may determine and transmit a suggested vehicle instruction to pre-filtering circuit 210 of one or more vehicles in a first cluster of vehicles 510. A first vehicle in first cluster of vehicles 510 may perform the action (e.g., executor) or not perform the action (e.g., non-executor) corresponding with the suggested vehicle instruction. As an illustrative example, the suggested vehicle instruction may comprise an instruction to slow down the vehicle. As discussed herein, the vehicle speed may be sensed by a wheel rotation sensor internal to the vehicle to identify whether the vehicle is slowing down upon receiving the suggested vehicle instruction. Other methods of determining the vehicle speed may also be implemented, including determining a vehicle speed by a radar device that identifies a traveling speed at a first point of time and the second point of time, while the radar device is external to the vehicle.

The proposed traffic management system tracks the suggested vehicle instructions (e.g., speed advisories, lane-change recommendations) transmitted to the vehicles to determine which suggested vehicle instructions are executed and which are not executed (e.g., using vehicle-related data or time series data received from sensors).

This data may be provided as training data to a machine learning (ML) model, which can be implemented at any one of the network edge devices or cloud servers 540 or at data center 550. The ML model may correlate the sensor data, actions, driving behaviors, or other vehicle-related data to determine data that correlates with the one or more species of vehicles, including executors or non-executors of the suggested vehicle instruction. The ML model may continue to learn the most contrasting driving behavior between the different species (e.g., what the executor vehicles implemented and what the non-executor vehicles did not implement). The output from the trained ML model can correlate vehicles and vehicle-related data with which suggested vehicle instructions are executed or are not executed (e.g., as clusters of vehicles).

In some examples, the most contrasting driving behavior between the different species may be transferred other network edge devices or cloud servers 540B, 540C or data center 550. This may help other network edge devices or cloud servers 540B, 540C generate suggested vehicle instructions for vehicles that are predicted to perform actions based on the actions of earlier executors or non-executors. For example, when the system identifies an action that is not performed by the first cluster of non-executors in response to a first instruction, the system can predict that a second cluster of non-executors will fail to perform the same way in response to an identical instruction. The system can adjust the instruction to try to provoke a different response from the second cluster of non-executors and avoid the mistake of providing the same suggested vehicle instruction that will not be followed by the second cluster of non-executors. The system may modify the suggested vehicle instruction for the second cluster of non-executors or generate additional instructions to compensate the inaction of non-executors that was provided by network edge devices or cloud server 540A.

Figure 6:
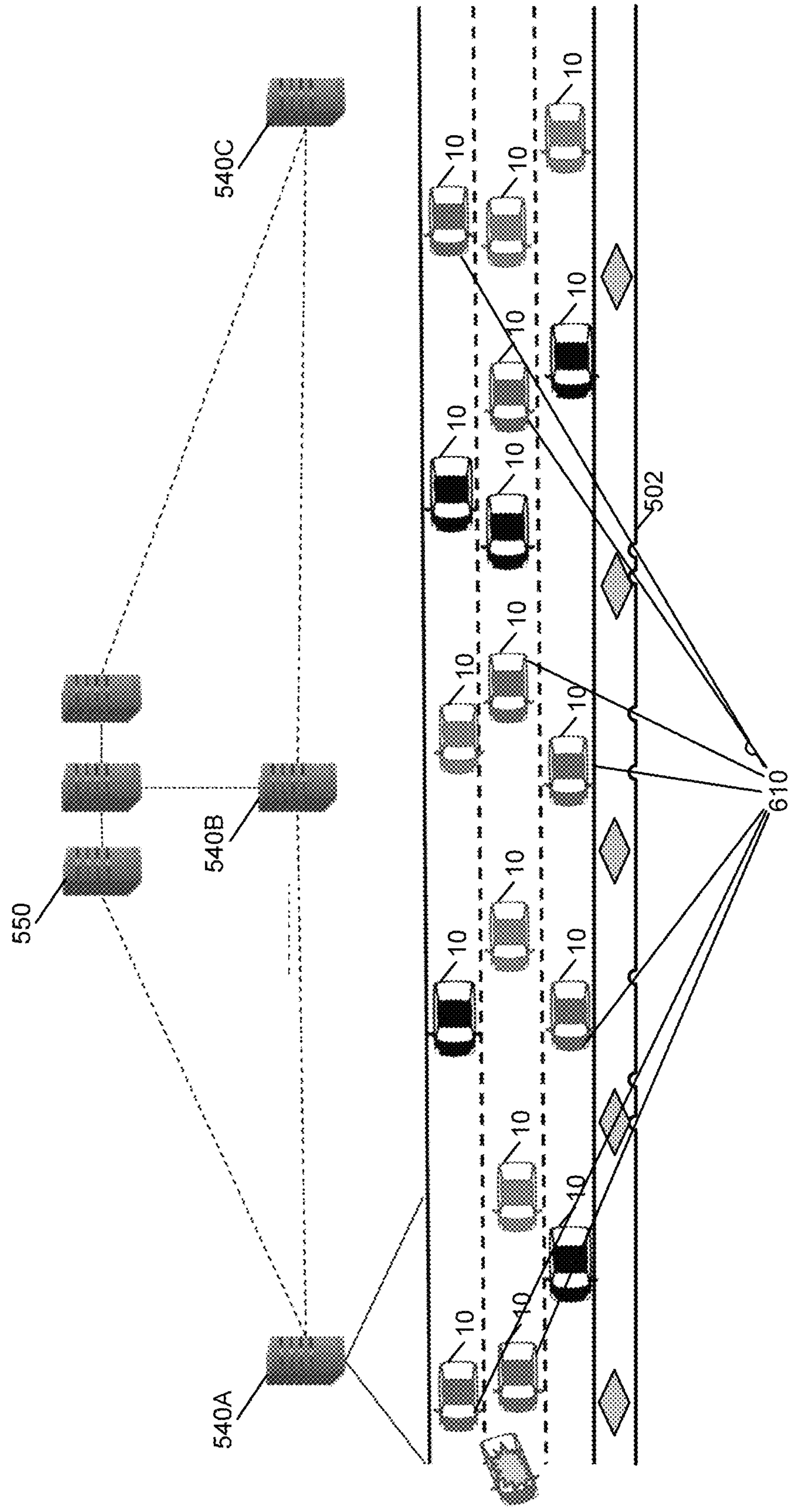
FIG. 6 is an example environment in which assisted traffic management using vehicle-related data is performed.

This clustering process in illustrated in FIG. 6. For example, the vehicles may be clustered using the trained ML model that correlates the vehicles and vehicle-related data with which suggested vehicle instructions are executed or are not executed (e.g., as clusters of vehicles). In this example, the first cluster of vehicles 610 is illustrated as comprising vehicles that are located throughout the roadway 502.

To determine the cluster of vehicles, the network edge devices or cloud servers 540 or data center 550 may infer the vehicle-related data that may lead to the vehicles that execute and do not execute the suggested vehicle instruction. The vehicles and vehicle-related data may be provided as input to the trained ML model and the output may identify the vehicles 10 that may form each clusters of vehicles. For example, vehicles in the cluster of vehicles 610 may be predicted to perform a similar action in response to an identical instruction. As such, when the first vehicle in a cluster of vehicles 610 performs the action, the network edge devices or cloud servers 540 or data center 550 may infer the underlying reasons of acceptance and rejection of the suggested vehicle instructions by other vehicles in the cluster of vehicles 610. The inference may identify the underlying reasons of acceptance and rejection for different vehicles in similar clusters would likely perform a same action to an identical instruction (e.g., based on the trained ML model or other similarities identified between the vehicles).

For example, the inference of the underlying reasons of acceptance and rejection of the suggested vehicle instructions may be based on vehicle-related data. In a sample illustration, a first network edge device or cloud server 540A transmits a suggested vehicle instruction to a first set of vehicles (e.g., a first subset of cluster 510) and may also initiate tracking of these vehicles (e.g., received as vehicle-related data). The tracking performed by first network edge device or cloud server 540A may observe the vehicles from cluster 510 that are performing an action. First network edge device or cloud server 540A may correlate the actions of the vehicles, responses provided by the human operators or autonomous vehicles, and other information with the suggested vehicle instruction to form knowledge or analytics associated with the suggested vehicle instruction.

A second set of vehicles may be observed as well (e.g., a second subset of cluster 510 or a second cluster 520), which associates two species of vehicles with first network edge device or cloud server 540A. The first species or subset may perform an action that follows the suggested vehicle instruction and the second species or subset may not. First network edge device or cloud server 540A can learn from these two species (e.g., differences and similarities in actions and vehicle-related data) and infer whether the action is complying with the first vehicle instruction or not executing it. For example, the learning process can run a time series analysis and find the most discriminative driving behavior between the two species or subsets.

Illustrative examples of discriminative driving behavior for these two species under given suggested vehicle instruction can include a lane change in response to a traffic incident. The discriminative driving behavior can identify the non-executors as not performing the suggestion and intentionally slowing down as the vehicle approaches the traffic incident for a better view. First network edge device or cloud server 540A can infers the underlying reason that non-executor did not execute the suggested vehicle instruction is that the human vehicle operator wanted to see the incident (e.g., rubbernecking or a reaction of the human vehicle operator as they pass by the traffic incident or something happening on road 502). Slowing down to see the traffic incident may be identified from the vehicle-related data including the decreased speed by the subject vehicle. First network edge device or cloud server 540A may associate the underlying reason for one of the species of vehicles as non-executors in that they wanted to view the traffic incident instead of following the suggested vehicle instruction. First network edge device or cloud server 540A can transmit this knowledge or analytics to other network edge devices or cloud servers, including second network edge device or cloud server 540B, and request that this device determine an additional suggestion while considering the underlying reason for one of the species of vehicles (e.g., rubbernecking). Second network edge device or cloud server 540B uses this knowledge and comes up with additional suggestions different than the lane change instruction to compensate the non-executors that first network edge device or cloud server 540A identified.

In another example, the action may be inferred based on a set of rules associated with an autonomous vehicle. For example, when the vehicle is a non-executor, the vehicle may reject a given suggestion due to many reasons. The instruction may be marked as risky by the autonomous or ADAS vehicle rules (e.g., the system may have one or more predefined thresholds and the suggested vehicle instruction may violate these thresholds). In another example, the autonomous vehicle may be required to take the approval from a human onsite driver or remote driver and the driver is not responding. In yet another example, the instruction may contradict with the autonomous vehicle reward functions (e.g., the system may try to maximize the speed, but given suggestion reduces the speed). The inference may be related to these or other reasons that may be inferred from the action of the vehicle.

In some examples, the trained ML model may also identify which types of suggested vehicle instructions will likely be followed by the vehicles in a cluster of vehicles. For example, vehicles in the cluster of vehicles 610 may be more likely to follow a speed advisory and slow down the vehicle but not a suggested vehicle instruction to perform a lane change. As another example, vehicles in a second cluster of vehicles may follow a speed advisory and slow down the vehicle upon receiving a compensation action, but may not follow the speed advisory without the compensation action.

As an illustrative example, the suggested vehicle instruction may include an instruction to slow the first vehicle to a slower traveling speed. When the first vehicle in the cluster of vehicles 610 does not comply with the instruction, the system may observe the actions and infer the reasoning why our suggestions are rejected. As such, the vehicles that are behind the first vehicle may be offered compensation to comply with the instruction. For example, the suggested vehicle instruction may be sent to a second vehicle in the cluster of vehicles 610 with the compensation action is offering a monetary value to slow the traveling speed (e.g., a gift card value, a monetary payment to a wallet account, or other compensation).

As another illustrative example, the suggested vehicle instruction may include an instruction to the first vehicle to change lanes. When the first vehicle in the cluster of vehicles 610 does not comply with the instruction, the system may infer that other vehicles in the cluster will not likely follow the instruction either. As such, the vehicles that are behind the first vehicle may be offered compensation to comply with the instruction. For example, the suggested vehicle instruction may be sent to a second vehicle in the cluster of vehicles 610 with the compensation action is offering a monetary value to change lanes (e.g., a gift card value, a monetary payment to a wallet account, or other compensation).

As another illustrative example, the suggested vehicle instruction may include an instruction to the first vehicle to enter a high-occupancy vehicle (HOV) lane. When the first vehicle in the cluster of vehicles 610 does not comply with the instruction, the system may infer that other vehicles in the cluster will not likely follow the instruction either. As such, the vehicles that are behind the first vehicle may be offered compensation to comply with the instruction. For example, the suggested vehicle instruction may be sent to a second vehicle in the cluster of vehicles 610 with the compensation action is offering a monetary value to enter the HOV lane (e.g., a gift card value, a monetary payment to a wallet account, or other compensation).

Using the trained ML model, the system may generate knowledge regarding the underlying reason(s) the non-executing drivers did not follow the suggested vehicle instruction. That knowledge may be shared with other nearby network edge devices or cloud servers 540 serving different regions of the roadway network or different clusters of vehicles. When such a network edge device or cloud server receives knowledge, it can generate additional suggested vehicle instructions accordingly.

The additional suggested vehicle instructions may vary based on several factors (e.g., in order to help improve traffic flow overall). That is, the network edge devices or cloud servers 540 may attempt to compensate for the unexecuted vehicle instructions while achieving an assigned objective (e.g., abate traffic or move traffic away from an accident).

In some examples, the additional suggested vehicle instructions may vary based on an identification of the second vehicle. For example, the first vehicle and the second vehicle may not be part of the same cluster of vehicles. In another example, the first vehicle or the second vehicle are a patrol officer. In this example, the first instruction to the first vehicle may be to adjust operation of the vehicle (e.g., slow down) and, based on the action performed by the first vehicle, the second instruction to the second vehicle (e.g., patrol officer) may be to perform a different action based on the action of the first vehicle (e.g., abate or slow down traffic after the first vehicle).

Figure 7:
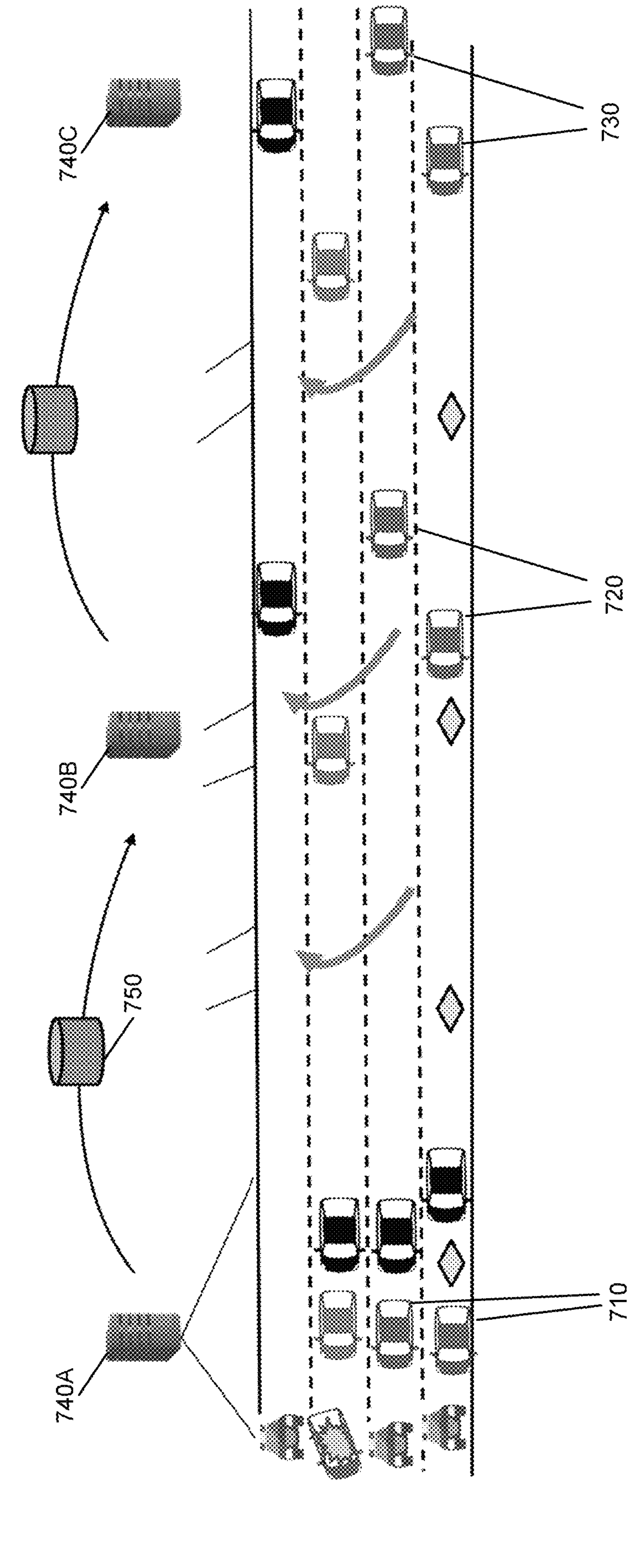
FIG. 7 is an example environment in which assisted traffic management using vehicle-related data is performed.

FIG. 7 is an example environment in which assisted traffic management using vehicle-related data is performed. In this example, a cluster of vehicles is identified as vehicles across the roadway that may perform an similar action and are at different parts of the roadway. The cluster of vehicles may include a first portion 710, second portion 720, and third portion 730. The vehicle-related data for these vehicles in the first portion 710, second portion 720, and third portion 730 of the cluster of vehicles may be provided to network edge device or cloud servers 740 (illustrated as first network edge device or cloud server 740A, second network edge device or cloud server 740B, and network edge device or cloud server 740C) that can transmit suggested vehicle instructions to one or more vehicles, including a first portion 710, second portion 720, and third portion 730 of cluster of vehicles.

The suggested vehicle instructions to the portions of the cluster of vehicles may differ based on the location of the vehicle on the roadway. For example, a first suggested vehicle instruction may be determined and transmitted to the first portion 710 of the cluster of vehicles. A first vehicle may perform an action, and the vehicle-related data associated with the first portion 710 of the cluster of vehicles can be provided as input to the trained ML model to infer the likelihood that the vehicle will performed the action in response to the suggested vehicle instruction.

When the inference is high (e.g., exceeding a threshold value) and the action follows the suggested vehicle instruction, the network edge device or cloud servers 740 may provide the same suggested vehicle instruction to a second vehicle in the second portion 720 of the cluster of vehicles or third portion 730 of the cluster of vehicles.

When the inference is high (e.g., exceeding a threshold value) and the action does not follow the suggested vehicle instruction, the network edge device or cloud servers 740 may provide a compensation amount with the same suggested vehicle instruction to a second vehicle in the second portion 720 of the cluster of vehicles or third portion 730 of the cluster of vehicles.

When the inference is low (e.g., failing to exceed a threshold value) and the action does follow or does not follow the suggested vehicle instruction, the network edge device or cloud servers 740 may provide a compensation amount with the same or different suggested vehicle instruction to a second vehicle in the second portion 720 of the cluster of vehicles or third portion 730 of the cluster of vehicles.

In some examples, the vehicle-related data corresponding with the second vehicle may be provided as input to the trained ML model. However, it may be unlikely that an inference may be generated that correlates a future action performed by the second vehicle and the vehicle-related data. This is because the first vehicle and the second vehicle are grouped in the same cluster of vehicles and may share similar characteristics to perform actions in response to similar instructions (e.g., based on historical actions). As such, a greater compensation amount may be provided to the second vehicle then was provided to the first vehicle, at least based in part on the first vehicle performing are not performing the action.

Figure 8:
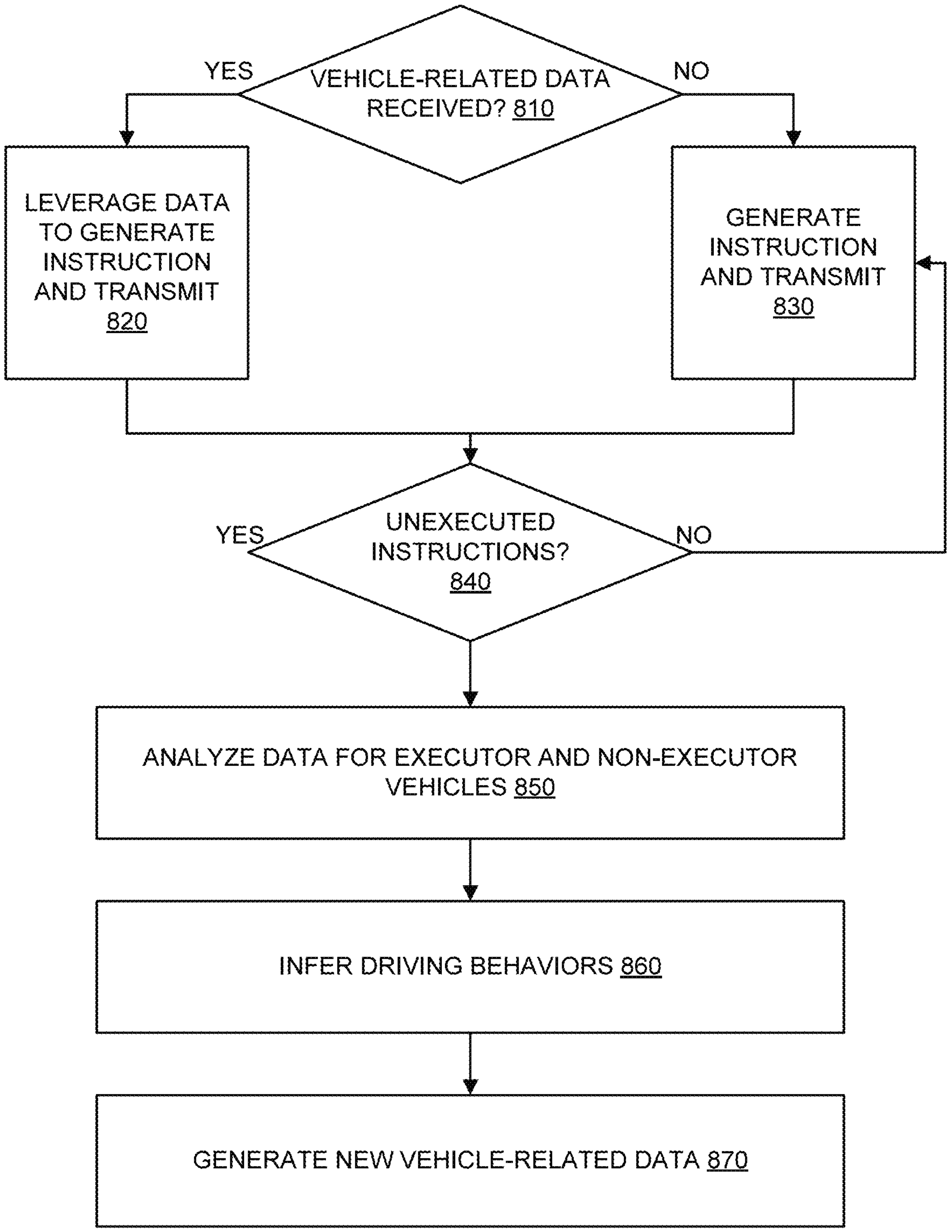
FIG. 8 is a flow chart illustrating example operations for implementation pre-filtering in accordance with one embodiment.

FIG. 8 is a flow chart illustrating example operations for implementing traffic assistance in accordance with one embodiment. In this example, the process may be performed by various devices described herein, including the network edge devices or cloud servers 540 or data center 550 illustrated in FIGS. 5 and 6, or the network edge device or cloud servers 740 illustrated in FIG. 7.

At block 810, the process may determine if vehicle-related data is received. For example, the vehicle-related data may be received from a network edge device or cloud server. If yes, the process may proceed to block 820. If no, the process may proceed to block 830.

At block 820, the process may leverage the vehicle-related data and generate one or more suggested vehicle instructions. In some examples, the suggested vehicle instruction may include a compensation amount to try to encourage the vehicle to perform an action corresponding to a suggested vehicle instruction that has a high likelihood of remaining unexecuted.

At block 830, the process may generate suggested vehicle instructions for vehicles in a cluster of vehicles and transmit the instructions with the vehicles.

At block 840, the process may determine whether any unexecuted suggested vehicle instructions remain. If yes, the process may proceed to block 850. If no, the process may return back to block 830.

At block 850, the process may analyze the vehicle-related data of vehicles in which given suggested vehicle instructions are executed and not executed.

At block 860, the process may infer contrasting driving behavior between the executors and the non-executor vehicles. For example, the process may perform a time-series analysis of vehicle-related data for vehicles that performed an action in response to the instruction and/or perform a time-series analysis of vehicle-related data for vehicles that did not perform the action in response to the instruction.

At block 870, the process may perform reasoning on top of inferred driving behavior and construct this as vehicle-related data. The process may share the vehicle-related data with other nearby entities (e.g., a first network edge device or cloud server 540A sharing with a second network edge device or cloud server 540B). In some examples, the suggested vehicle instruction may be provided with a suggestion or request to include a compensation action or amount.

Figure 9:
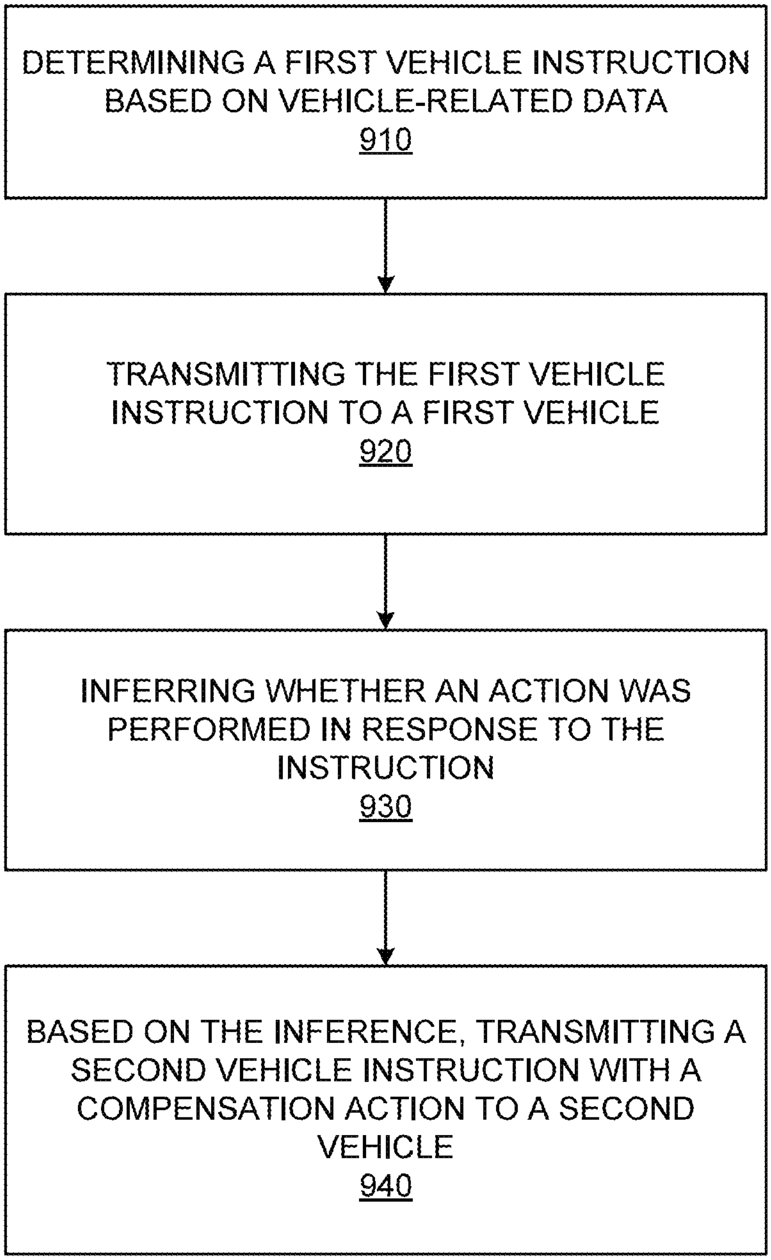
FIG. 9 is a flow chart illustrating example operations for implementation pre-filtering in accordance with one embodiment.

FIG. 9 is a flow chart illustrating example operations for implementing traffic assistance in accordance with one embodiment. In this example, the process may be performed by various devices described herein, including the network edge devices or cloud servers 540 or data center 550 illustrated in FIGS. 5 and 6, or the network edge device or cloud servers 740 illustrated in FIG. 7.

At block 910, the process may determine a first vehicle instruction. The first vehicle instruction may be based on vehicle-related data.

At block 920, the process may transmit the first vehicle instruction to a first vehicle.

At block 930, the process may infer whether an action was performed in response to the instruction. For example, when the first vehicle performs the action, the process may infer whether the action is in response to the first vehicle instruction.

At block 940, based on the inference, the process may transmit a second vehicle instruction with a compensation action to a second vehicle.

In some examples, the first vehicle and the second vehicle are grouped in a cluster of vehicles by a trained machine learning (ML) model.

In some examples, the first vehicle instruction is to slow a traveling speed, and when the action performed by the first vehicle does not comply with the first vehicle instruction, the compensation action is offering a monetary value to slow the traveling speed.

In some examples, the first vehicle instruction is to change lanes, and when the action performed by the first vehicle does not comply with the first vehicle instruction, the compensation action is offering a monetary value to change lanes.

In some examples, the first vehicle instruction is to enter a high-occupancy vehicle (HOV) lane, and when the action performed by the first vehicle does not comply with the first vehicle instruction, the compensation action is offering a monetary value to enter the HOV lane.

In some examples, the first vehicle instruction and the second vehicle instruction are identical instructions.

In some examples, the second vehicle is a patrol officer and the second vehicle instruction is to abate traffic after the first vehicle.

In some examples, the vehicle-related data is determined by one of a network edge device, a cloud server, or an artificial intelligence analytics system resident on a vehicle associated with the vehicle-related data.

In some examples, the vehicle-related data originates from at least one of the first vehicle, another vehicle in communication with the first vehicle, and a third-party information source.

In some examples, the first vehicle instruction is a plurality of instructions and the inference includes determining which of the plurality of instructions were followed by the first vehicle.

Figure 10:
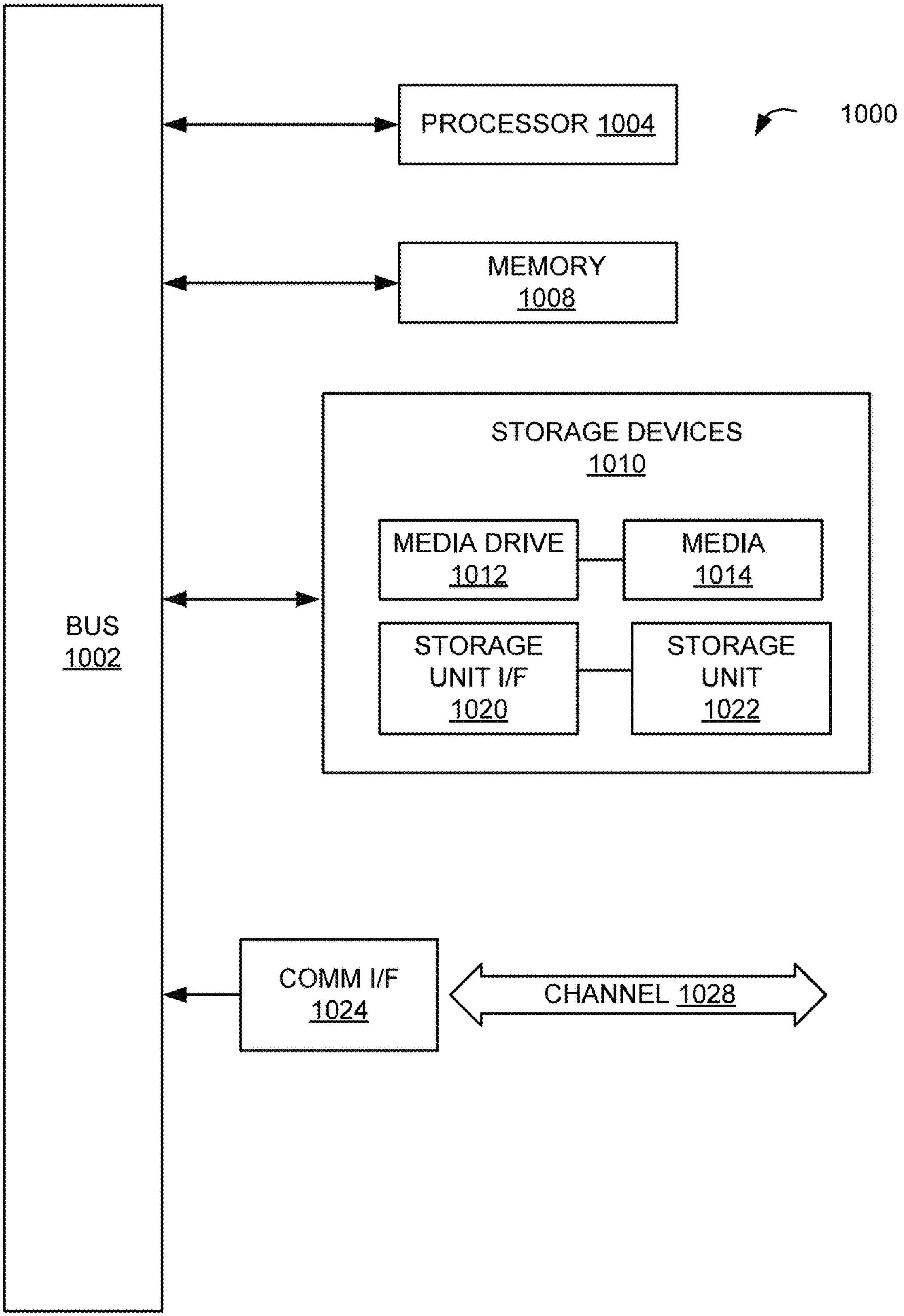
FIG. 10 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example-computing component 600. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor 1004. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

generating, via a trained machine learning (ML) model, a first vehicle instruction for a first vehicle based on vehicle-related data of the first vehicle;

determining, via the trained ML model, a value of inference that the first vehicle instruction will be executed by the first vehicle based on the vehicle-related data of the first vehicle;

transmitting the first vehicle instruction to the first vehicle;

when the first vehicle performs an action in response to the first vehicle instruction, determining whether the action performed by the first vehicle does or does not comply with the first vehicle instruction;

generating, via the trained ML model, a second vehicle instruction for a second vehicle based on the value of inference that the first vehicle instruction will be executed by the first vehicle and whether the action Performed by the first vehicle does or does not comply with the first vehicle instruction, wherein the second vehicle instruction includes a compensation action based on the value of inference that the first vehicle instruction will be executed by the first vehicle and whether the action performed by the first vehicle does or does not comply with the first vehicle instruction;

transmitting the second vehicle instruction to the second vehicle; and causing the second vehicle to operate in accordance with the second vehicle instruction.

2. The method of claim 1, wherein the compensation action comprises an incentive offering to correct non-compliant actions performed by a vehicle.

3. The method of claim 1, wherein the first vehicle instruction is to slow a traveling speed, and when the action performed by the first vehicle does not comply with the first vehicle instruction, the compensation action is offering a monetary value to slow the traveling speed.

4. The method of claim 1, wherein the first vehicle instruction is to change lanes, and when the action performed by the first vehicle does not comply with the first vehicle instruction, the compensation action is offering a monetary value to change lanes.

5. The method of claim 1, wherein the first vehicle instruction is to enter a high-occupancy vehicle (HOV) lane, and when the action performed by the first vehicle does not comply with the first vehicle instruction, the compensation action is offering a monetary value to enter the HOV lane.

6. The method of claim 1, wherein generation, via the trained ML model, the second vehicle instruction for the second vehicle based on the value of inference that the first vehicle instruction will be executed by the first vehicle and whether the action performed by the first vehicle does or does not comply with the first vehicle instruction comprises:

responsive to the value of the inference exceeding a threshold value and the action performed by the first vehicle complying with the first vehicle instruction, the second vehicle instruction being generated to be same as the first vehicle instruction;

responsive to the value of the inference exceeding the threshold value and the action performed by the first vehicle not complying with the first vehicle instruction, the second vehicle instruction being generated to comprise (1) the first vehicle instruction and (2) the compensation action to perform the first vehicle instruction; and responsive to the value of the inference not exceeding the threshold value and the action performed by the first vehicle complying or not complying with the first vehicle instruction, the second vehicle instruction being generated to comprise (1) the first vehicle instruction or a different vehicle instruction and (2) the compensation action to perform the first vehicle instruction or the different vehicle instruction.

7. The method of claim 1, wherein the second vehicle is a patrol officer and the second vehicle instruction is to abate traffic after the first vehicle.

8. The method of claim 1, wherein the vehicle-related data is determined by one of a network edge device, a cloud server, or an artificial intelligence analytics system resident on a vehicle associated with the vehicle-related data.

9. The method of claim 1, wherein the vehicle-related data originates from at least one of the first vehicle, another vehicle in communication with the first vehicle, and a third-party information source.

10. A network edge device or cloud server comprising:

a memory; and one or more processors that are configured to execute machine readable instructions stored in the memory for performing a method comprising:

generating, via a trained machine learning (ML) model, a first vehicle instruction for a first vehicle based on vehicle-related data of the first vehicle;

determining, via the trained ML model, a value of inference that the first vehicle instruction will be executed by the first vehicle based on the vehicle-related data of the first vehicle;

transmit the first vehicle instruction to the first vehicle;

when the first vehicle performs an action in response to the first vehicle instruction, determining whether the action performed by the first vehicle does or does not comply with the first vehicle instruction;

generating, via the trained ML model, a second vehicle instruction for a second vehicle based on the value of inference that the first vehicle instruction will be executed by the first vehicle and whether the action performed by the first vehicle does or does not comply with the first vehicle instruction, wherein the second vehicle instruction includes a compensation action based on the value of inference that the first vehicle instruction will be executed by the first vehicle and whether the action performed by the first vehicle does or does not comply with the first vehicle instruction;

transmitting the second vehicle instruction to the second vehicle; and causing the second vehicle to operate in accordance with the second vehicle instruction.

11. The network edge device or cloud server of claim 10, wherein the compensation action comprises an incentive offering to correct non-compliant actions performed by a vehicle.

12. The method of claim 1, wherein the first vehicle and the second vehicle are identified to be part of a same cluster of vehicles responsive to prediction of the first vehicle and the second vehicle performing a similar action in response to an identical instruction.

13. The network edge device or cloud server of claim 10, wherein the first vehicle instruction is to slow a traveling speed, and when the action performed by the first vehicle does not comply with the first vehicle instruction, the compensation action is offering a monetary value to slow the traveling speed.

14. The network edge device or cloud server of claim 10, wherein the first vehicle instruction is to change lanes, and when the action performed by the first vehicle does not comply with the first vehicle instruction, the compensation action is offering a monetary value to change lanes.

15. The network edge device or cloud server of claim 10, wherein the first vehicle instruction is to enter a high-occupancy vehicle (HOV) lane, and when the action performed by the first vehicle does not comply with the first vehicle instruction, the compensation action is offering a monetary value to enter the HOV lane.

16. The network edge device or cloud server of claim 10, wherein generation, via the trained ML model, the second vehicle instruction for the second vehicle based on the value of inference that the first vehicle instruction will be executed by the first vehicle and whether the action performed by the first vehicle does or does not comply with the first vehicle instruction comprises:

responsive to the value of the inference exceeding a threshold value and the action performed by the first vehicle complying with the first vehicle instruction, the second vehicle instruction being generated to be same as the first vehicle instruction;

responsive to the value of the inference exceeding the threshold value and the action performed by the first vehicle not complying with the first vehicle instruction, the second vehicle instruction being generated to comprise (1) the first vehicle instruction and (2) the compensation action to perform the first vehicle instruction; and responsive to the value of the inference not exceeding the threshold value and the action performed by the first vehicle complying or not complying with the first vehicle instruction, the second vehicle instruction being generated to comprise (1) the first vehicle instruction or a different vehicle instruction and (2) the compensation action to perform the first vehicle instruction or the different vehicle instruction.

17. The network edge device or cloud server of claim 10, wherein the second vehicle is a patrol officer and the second vehicle instruction is to abate traffic after the first vehicle.

18. The network edge device or cloud server of claim 10, wherein the vehicle-related data is determined by one of a network edge device, a cloud server, or an artificial intelligence analytics system resident on a vehicle associated with the vehicle-related data.

19. The network edge device or cloud server of claim 10, wherein the vehicle-related data originates from at least one of the first vehicle, another vehicle in communication with the first vehicle, and a third-party information source.

20. The network edge device or cloud server of claim 10, wherein the first vehicle and the second vehicle are identified to be part of a same cluster of vehicles responsive to prediction of the first vehicle and the second vehicle performing a similar action in response to an identical instruction.

* * * * *